INVENTORS
**RENÉ N. SILVA
GERARD M. SALAZAR**

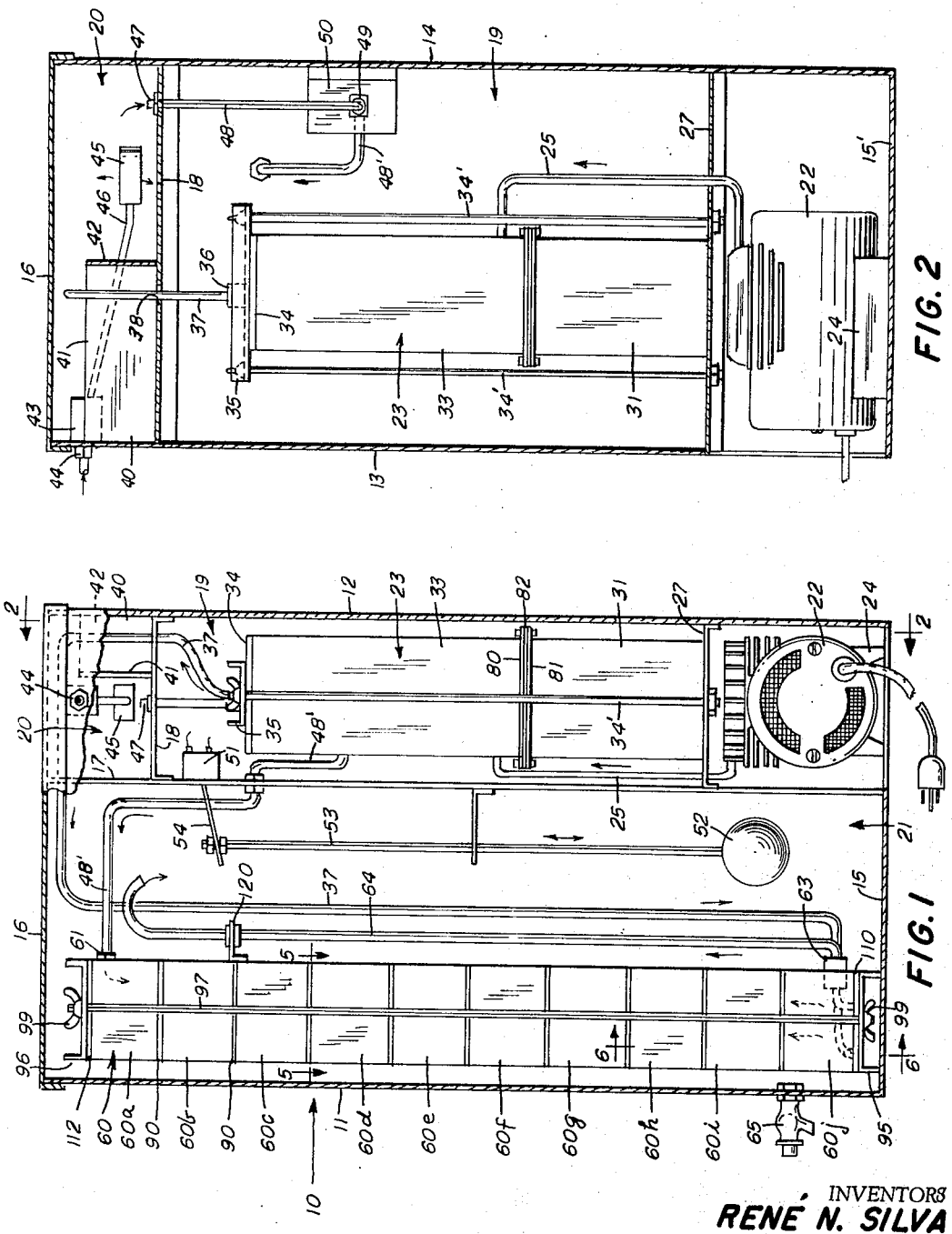

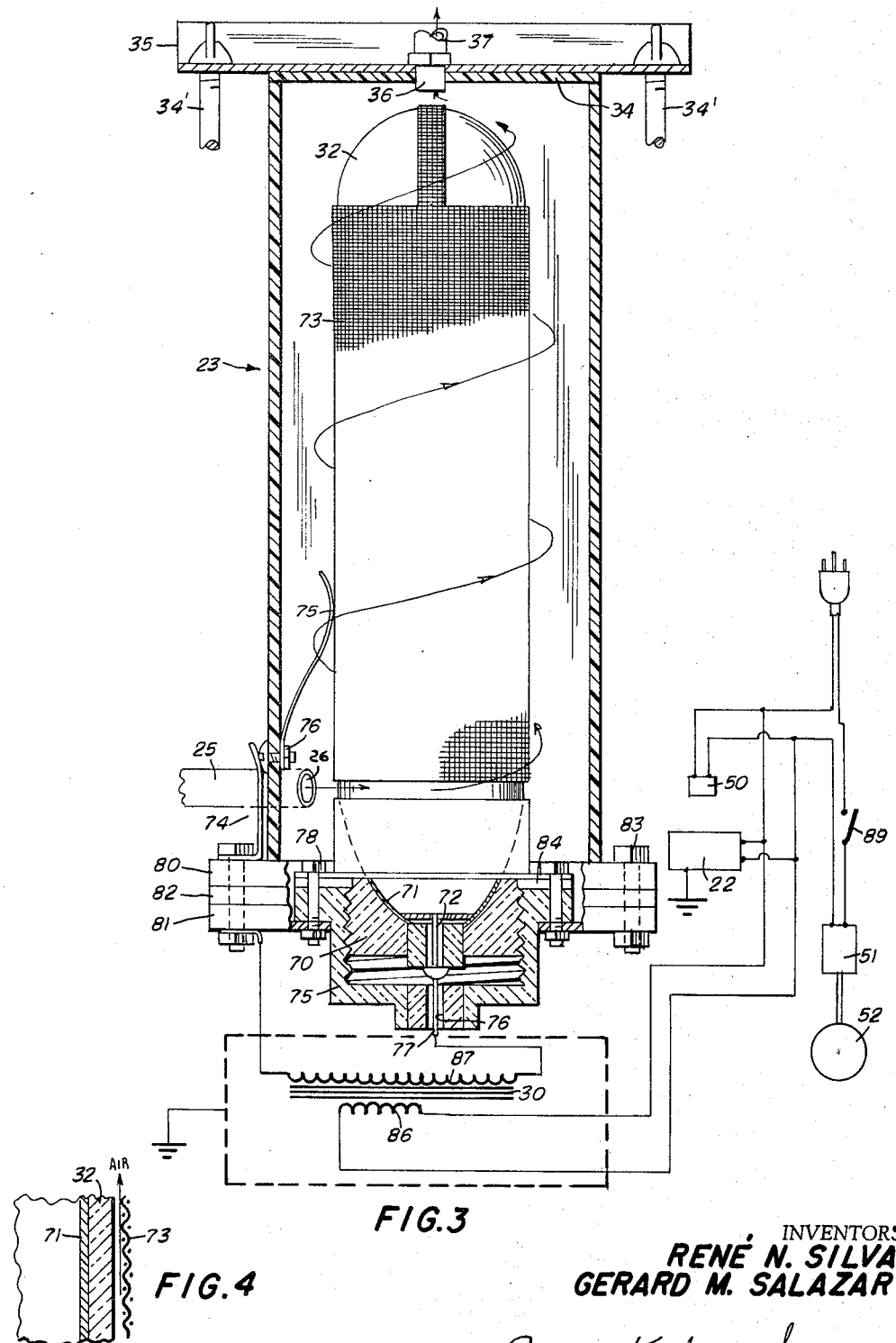

BY *Cameron, Kerkam & Sutton*

ATTORNEYS

United States Patent Office 3,362,697
Patented Jan. 9, 1968

3,362,697
OZONE WATER TREATMENT PLANT
René N. Silva, Waldwick, N.J., and Gerard M. Salazar, Philadelphia, Pa., assignors to The Welsbach Corporation, Philadelphia, Pa., a corporation of Delaware
Original application Sept. 12, 1963, Ser. No. 308,498. Divided and this application Jan. 26, 1967, Ser. No. 635,633
4 Claims. (Cl. 261—114)

ABSTRACT OF THE DISCLOSURE

An ozonator in which unpurified water is introduced at the top of a mixing chamber and ozone is introduced at the bottom. The ozonator is controlled by the level of purified water as is also the flow of unpurified water. The mixing chamber is a series of vertically stacked sections divided by inclined baffle plates apertured at their high ends for downward flow of water and upward flow of ozone, adjacent baffle plates being oppositely inclined.

Cross-reference to related application

This application is a division of my copending application Ser. No. 308,498, filed Sept. 12, 1963, now abandoned.

This invention relates generally to apparatus for purifying water and more particularly to the generation of ozone and its utilization in the sterilization, purification and other treatment of water.

In general, in many areas of the world, a serious water purification problem has long existed. The water from available sources is often of extremely bad taste and odor, is frequently acidic, contains objectionable amounts of iron and other metal salts, etc. Many and various proposals have been made and many tried to purify local water, yet bad water still persists as a general widespread problem, especially in areas not served by large city water systems.

The principle of effecting the removal of contained gases and/or minerals from liquids through the mixing of air with such liquids, or through the passage of ozone through such liquids for the purpose of affecting bacteria in organic matter, is of course well known. However, the prior apparatus designed to carry out this principle has been open to certain objections. Generally, such apparatus is complex in nature and requires many moving parts and power driven components such as blowers, fans, coolers, driers, etc. The maintenance of these moving parts as well as the long retention period required after aeration to effect the desired oxidation of the contained gases or minerals results in an apparatus which is expensive and inefficient, producing only a relatively incomplete amount of oxidation, or which is so cumbersome and expensive as to be unsuitable for domestic installation and operation.

In the present invention, there is provided a small, compact and fully automatic ozone water treatment plant which may be used domestically for the sterilization, purification and other treatment of water.

Accordingly, it is an object of this invention to provide an improved water treatment apparatus for domestic use which is economical in construction and efficient in operation and which assures at all times the purification of drinking water and removal of objectionable taste and odors therefrom.

Another object of this invention is to provide an improved water treatment plant which is compact and economical in construction and which may be conveniently connected for domestic use.

Another object of this invention is to provide an improved water treatment plant which will operate automatically and efficiently with a minimum of attention and maintenance.

Yet another object of this invention is to provide an improved water treatment plant which will purify and sterilize water without the necessity of chemicals, such as inhibitors, flocculating agents, etc., added to the water.

In accordance with the present invention, in one embodiment thereof, there is provided a fully compact and automatic ozone water treatment plant entirely housed within a single cabinet. The water treatment plant of the present invention is suitable for domestic use and is arranged to be connected to a standard household current supply and household water supply. The water to be treated enters a head tank having a float valve therein for controlling the amount of water entering the treatment plant. Exit of the untreated water from the head tank is controlled by a solenoid stop valve which is in turn energized in response to the water level of the treated water in a storage chamber within the cabinet. A source of ozone for treating the water is produced by passing a supply of low pressure compressed air through an ozone generating unit. The ozonized air or ozone output of the ozone generating unit is translated to the lower end of a mixing or treating chamber wherein the ozone is diffused and caused to bubble upwardly through the mixing chamber in a tortuous path. The untreated water from the head tank is translated to the upper end of the treating chamber and is caused to gravitate downwardly in a tortuous path, counter to that of the upwardly flowing ozone. The counter flow of the ozone and water provides for an increased time of contact between the ozone and the water and facilitate the mixing thereof to thereby sterilize, deodorize, decolorize and remove any undesirable matter from the water. The treated water is then stored in a storage chamber having a float switch responsive to the level of the treated water and an outlet faucet for access to the contents therein. When the level of the treated water recedes below a pre-set level, the float switch establishes the electrical circuit for energization of the ozonator solenoid stop valve and compressor to thereby cause more untreated water and ozone to be introduced and intermingled in the mixing chamber and to consequently increase the supply of treated water within the storage tank. The process is continuous and automatic and can be used in any household or other location where there is running water, either supplied by a municipal distribution system or a private source, such as artesian wells, fountains, etc.

In accordance with another feature of the present invention, there is provided a new and novel mixing chamber for intermingling the untreated water and ozone which provides for an increased time of contact between the ozone and water. The ozone and untreated water are caused to flow in a zigzag pattern, counter to each other to allow sufficient contact or retention time between the ozone and water to complete the treatment. In addition, due to the unique structure of the mixing chamber, the mixing chamber can be easily dismantled and reassembled for cleaning of the parts where a precipitable matter is contained within the water supply and has been precipitated within the mixing chamber.

While the specification concludes with claims particularly pointing out and distinctly claiming subject matter regarding the invention, it is believed the invention will be better understood from the following description taken in connection with the accompanying drawing.

FIGURE 1 is a vertical cross-sectional view showing the various compartments of the improved water treatment plant;

FIGURE 2 is a side vertical view, taken along line 2—2, of the apparatus shown in FIGURE 1 with the side wall removed;

FIGURE 3 is a cross-sectional view of the ozone generating dielectric tube and the wiring system used in connection with the water treatment plant;

FIGURE 4 is a fragmentary view, partly in section, of the dielectric tube; and

Figure 5:
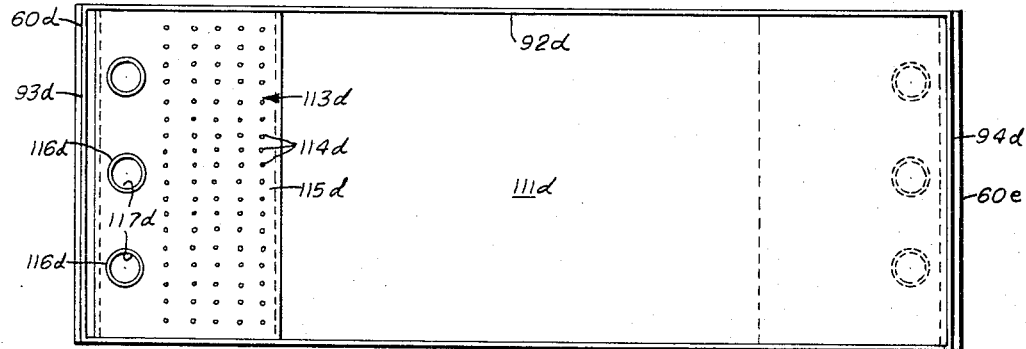
FIGURES 5 and 6 are plan and vertical cross-sectional views of the mixing chambers, respectively.

Referring now to FIGURE 1, there is illustrated the fully automatic and compact ozone water treatment plant 10 embodied in this invention. The water treatment plant 10 is housed or completely contained within a cabinet having four vertical side walls 11, 12, 13 and 14, a base 15 and a cover 16. The cabinet is conveniently compartmentalized by means of a vertical section plate 17 and a horizontal section plate 18 to form three separate compartments 19, 20, 21.

The first compartment 19 houses the compressor 22, ozone generating unit 23, solenoid stop valve 50 and switch 51, and is arranged at the right side of the cabinet being formed by sections of walls 12, 13 and 14, vertical section plate 17, base 15 and horizontal section plate 18. Compressor 22 may be secured to the base 15 of cabinet 10 by means of bracket 24 in any suitable manner. A suitable opening, such as a window or louvers is provided in that portion of the wall 13 nearest the compressor intake to allow air to be drawn into the compressor 22. Any standard commercial air compressor may be utilized to provide a supply of low pressure air and which can be arranged to be energized from a standard household electrical supply line. One such commercially available compressor is the Sprayit Model 90–140 oilless diaphragm compressor manufactured by Thomas Industries, Inc. of Sheboygan, Wisconsin.

The low pressure, compressed air output of the compressor 22 is translated through a conduit or tube 25 to the air inlet 26 of the ozone generating unit 23 which produces a suitable supply of ozone in a manner to be hereinafter described. If desired, the compressor air inlet opening in the wall 13 may be provided with a filter in order to clean the air prior to its entrance into the water treatment plant 10. In addition, suitable cooling openings (not shown) are provided in the base 15 for cooling the air compressor 22.

The ozone generating unit 23 is supported on a mounting plate 27 located above the compressor and suitably affixed to the walls 13 and 14 at vertical section plate 17 by welding, brazing or the like. The ozone generating unit comprises a transformer 30 arranged within a suitable housing 31 mounted directly on mounting plate 27 and one or more dielectric tube 32 for producing the ozone. Dielectric tube 32 is encased within a suitable airtight enclosure, which may be, for example, a bulb-type fitting or cylindrical resistant material casing 33 having a cover 34. The cover 34 for the casing 33 may be conveniently secured by means of threaded rods 34' extending from the mounting plate 27 through the cover 34 to a cover sealing plate 35. Sealing plate 35 forces the cover 34 into air sealing engagement with the casing 33. It should be readily apparent that any conventional means of isolating dielectric tube 32 may be utilized for confining the compressed air output of the compressor, the arrangement shown being used merely as an illustration.

The cover 34 and sealing plate 35 are provided with a suitable outlet opening for the ozone gas to which is secured a fitting 36 and tube 37. Tube 37 serves to conduct the ozone from the ozone generating unit or ozonator 23 to the mixing chamber 60 located within the third compartment 21, and is maintained at a height above the level of the water in the mixing chamber 60 in order to prevent the water from flowing back through the tube 37. Accordingly, tube 37 extends through a suitable opening or slot 38 in horizontal section plate 18 and is provided with a U-shaped bend to cause it to pass adjacent the cover 16, through vertical section plate 17 and downwardly to the mixing chamber within compartment 21.

The second compartment 20 serves to provide a head tank or chamber and is arranged at the uppermost right hand section of the water treatment plant 10 for storage of untreated or unpurified water. Compartment 20 is formed by the upper sections of walls 12, 13 and 14, vertical section plate 17, horizontal section plate 18 and part of the cover 16. Within compartment 20 is located a small water isolating chamber 40 which allows opening 38 to be machined with a loose tolerance and avoids the necessity of additional sealing of the opening 38. Isolating chamber 40 is formed by a pair of vertical, perpendicular plate members 41, 42 and portions of walls 12 and 13 and horizontal section plate 18. The height of vertical plate members 41 and 42 is shown so that they extend just above the highest water level reached within head tank 20; however, in the event the desired storage capacity for the untreated water is such as to require the head tank 20 to be completely filled, the vertical plate members 41 and 42 should extend to the cover 16 and be appropriately sealed to prevent any water from the head tank entering the chamber 40. It should also be readily apparent that opening 38 may be provided with a suitable fitting which would prevent access of water therethrough and obviate the need for the vertical plate members 41 and 42.

For maintaining the level of the untreated water within head tank 20 at a desired level, there is provided a float valve 43. Valve 43 has its water inlet end connected to a suitable fitting 44 on wall 13, which fitting is in turn connected to the source of untreated water. The opening and closing of valve 43 which controls the admittance of water to head tank 20 is controlled by float member 45 connected to valve 43 by stem 46. Such valves are well known and are generally adjustable to control the point at which the valve opens and closes and consequently the water level within the head tank 20.

Thet output of head tank 20 is translated through a water outlet 47 in the horizontal section plate 18 provided with a suitable fitting connection to which is connected tube 48. Tube 48 is further connected to the inlet 49 of solenoid stop valve 50 mounted on the inside surface of wall 14, as shown. Solenoid stop valve 50 is energized in response to the level of the treated water within compartment 21 by means of a float control switch 51, which also controls the energization of the compressor 22 and the ozone generating unit 23.

The third compartment 21 serves as a storage chamber for the treated or purified water and is formed by sections of walls 11, 13 and 14, base 15, cover 16 and vertical section plate 17. Within the storage chamber 21 is suitably mounted a sealed mixing chamber 60 within which the purification or treatment process takes place. The untreated water is passed through tube 48' to the untreated water inlet 61 located near the top of mixing chamber 60. The ozone output of ozone generating unit 23 is fed into the ozone inlet 62 at the lower extremity of the mixing chamber 60. The ozone and untreated water are caused to mingle in a manner to be hereinafter described, and the purified water exits at outlet 63 to the storage chamber 21 from which it may be withdrawn through a suitable valve such as, for example, valve 65 mounted on the wall 11.

For controlling the level of the purified water within the storage chamber 21, there is provided a float actuated switch 51 mounted within compartment 19 on the vertical section plate 17. Actuation of the switch 51 is effected through float 52 and its connecting arms 53 and 54.

When the water level within compartment 21 recedes in an amount so as to cause float 52 to reach its lowermost position, switch 51 is closed so as to electrically connect the compressor 22, ozone generating unit 23 and solenoid stop valve 50 to their respective electrical circuits. Energization of solenoid stop valve 50 opens tube 48 to cause the untreated water to enter at the upper end of the mixing chamber 60 within compartment 21 wherein it gravitates downwardly therethrough in a tortuous path. In the meantime, the compressor 22 furnishes a fresh supply of air to the ozone generating unit 23 wherein the electrical discharge produces a fresh supply of ozone which is translated through tube 37 to the lower end of the mixing chamber and passed upwardly therethrough in a tortuous path counter to that of the water which is gravitating downwardly. The process continues until the level of the purified water within the compartment or storage chamber 21 is reestablished to its previous level, whereby float 52 is returned to its raised position and switch 51 is opened, thus electrically disconnecting the compressor 22, ozone generating unit 23 and solenoid stop valve 50 from the power source.

Referring to FIGURE 3, there is shown in detail the dielectric tube structure 32 and the electrical wiring diagram for the water treatment plant 10 of the present invention. The ozone generating unit 23 comprising the ozone generating dielectric tube 32 and transformer 30 is illustrated as a single unit; however, it should be readily apparent that one or more ozone generating unit 23 may be utilized with each individual dielectric tube 32 being connected in series or parallel. The dielectric tube 32 is formed from a bulb-type dielectric material such as, for example, glass and has its lower end suitably affixed to an insulated threaded base member 70. The internal surface of the dielectric tube 32 is provided with a ground metal coating 71, shown in detail in FIGURE 4, which serves as the inner electrode. This coating 71 covers the entire inside wall of the dielectric tube 32 and extends downwardly until it makes contact with the central conductor or electrode 72 of the base member 70. The outer conductor of the dielectric tube 32 comprises a metal screen 73 which fits substantially around, but spaced therefrom, the body of the bulb of the dielectric tube 32.

For mounting the ozone generating tube, there is provided a suitable adapter or insulated socket 75, which may be porcelain, mounted on the upper portion of the transformer housing 31 by any suitable means such as screws 78. Socket 75 is provided with a central opening 76 within which is secured a connecting rod 77 which establishes contact with the inner or central electrode 72 of the dielectric tube base member 70 and transformer 30. For establishing contact with the outer conductor 73 of the dielectric tube 32, there is provided one or more pairs of metal straps 74 and 75. One end of strap 74 is connected through the transformer housing 31 to one end of the secondary winding of transformer 30. The other end of the metal strap 74 makes electrical contact through a conductive fastening arrangement 76 which fastens straps 75 to the insulative housing 33 for dielectric tube 32. On the inside of the insulative housing 33 and having one end connected to the conductive fastening arrangement 76 is the second strap 75, the other end of which presses against the outer conductor 73 to complete the electrical connection thereto.

The ozone generating dielectric tube 32 is maintained within a suitable airtight enclosure 33 which may be cylindrical or any other suitable configuration. The upper end of the enclosure 33 is sealed by means of sealing plate 35 on a manner hereinbefore described. For sealing the lower end, the enclosure 33 comprises a flange portion 80 which mates with flange 81 of the transformer housing 31. Between the two flanges 80 and 81 is provided a gasket 82, which may be made of any suitable ozone resistant material, such as Hypalon, for sealing the unit. The flanges 80 and 81 are secured together by means of screws 83 which press the gasket 82 tight to complete the sealing arrangement. In addition, a suitable sealing gasket 84 is also provided between the socket 75 and flange 80.

For providing the ozone generating dielectric tube 32 with a suitable source of high voltage to generate an electric discharge between the inner conductor 71 and the outer conductor 23, which may be, for example, an arc discharge, there is provided a step-up voltage transformer 30 having a primary winding 86 and a secondary winding 87. One end of secondary winding 87 is connected to the inner conductor 71 through electrodes 77 and 72. The other end of secondary winding 87 is connected to the outer conductor 73 through one or more pairs of metal conducting straps 74 and 75. The primary winding is connected to a suitable power source, which may be, for example, a standard household source of energy. The step-up turns ratio of the transformer windings which is, as an example, in the order of 100:1 provides a voltage across the dielectric tube inner and outer conductors 71 and 73, respectively, of the magnitude of 10 kv. to 15 kv.

Also electrically connected across the input power source and primary winding 86 is the compressor 22 and solenoid stop valve 50. In series with one of the power source input lines is the float actuated switch 51 and a conventional manually operated single pole, single throw operator's switch 89. With switch 89 thrown to its closed position, the water treatment plant is set for automatic operation under the control of float 52 and float operated switch 51.

Generation of ozone in the ozone generator unit 23 is commenced when switch 51 is closed, thus energizing the compressor 22 and transformer 30. The low pressure compressed air from the compressor 22 is introduced at inlet 26 tangentially to the outer wire screen electrode 73. The air circulates around the outer metal screen electrodes 73 and upward in a spiral pattern, as well as between the outer metal screen electrode 73 and the outer surface of the dielectric tube 32. The oxygen from the air is converted into ozone by means of the electrical discharge due to the potential difference across the inner and outer conductors of the dielectric tube 32. This ozonated air keeps moving upward until it reaches the outlet having fitting 36 mounted therein to which is affixed the tube 37. Consequently, the ozone produced in the ozone generating unit 23 is passed through tube 37 to the ozone inlet 62 at the lower portion of the mixing chamber 60.

Figure 6:
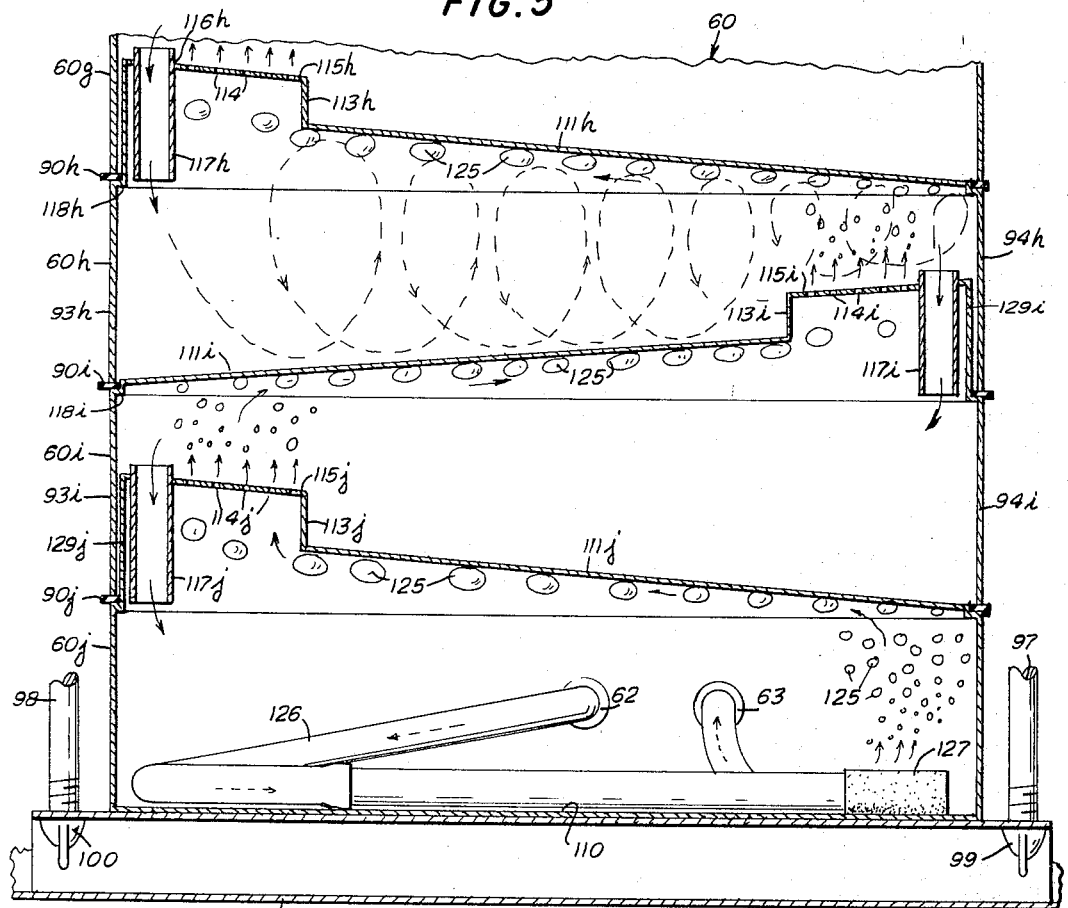

The details of the mixing chamber 60 are illustrated in FIGURES 5 and 6. The mixing chamber 60 may comprise several sections, 60a to 60j, vertically stacked and individually sealed by means of gasket 90 located between adjacent sections. Each of the sections a–j are substantially identical with slight modifications in sections a and j to provide for inlet and outlet openings for the ozone and water. Consequently, like parts for each section are identified with like numerals with a letter suffix designating the section to which the part corresponds.

Each section comprises four vertically oriented walls 91, 92, 93 and 94 forming a rectangular chamber, the lower and uppermost sections having a base and cover. The several sections may be secured together to form a single unit mixing chamber 60 by mounting the composite arrangement between a pair of channel members 95 and 96 held tightly by means of threaded rods 97 and 98 and fastening means 99 and 100, respectively. The lowermost channel member 95 may be secured to the base of the cabinet 11 by any suitable fastening means, such as welding or the like.

Referring to FIGURE 6, the lowermost section 60j is provided with a flat base member 110. The inclined horizontal top wall 111j of the lower section 60j serves as the base of the next adjacent upper section 60j. This arrangement continues until the uppermost section 60a is reached, in which case there is provided a flat horizontal top plate 112 around which any excess of ozone may escape.

The inclined horizontal top wall or baffle 111 of each section a–j has formed at the raised end of the incline, a box like chamber or concavity 113 having a plurality of small openings 114 in the upper surface or plate 115 in communication with the adjacent upper section and through which the ozonated air or ozone passes. The quantity of the openings will depend on the volume of the ozone, which in turn depends on the capacity of the water treating plant. It has been found that in a plant which runs with a capacity of 10 liters per hour, 27 openings of approximately 1/16 inch in diameter were sufficient. However, in plants operating with a greater capacity, many more openings can be utilized.

Adjacent the small openings 114, there are provided one or more larger openings 116 to which are affixed small tubes 117 of approximately 1½ inches in length. The tubes 117 serve to provide communication between adjacent sections and allow the water to flow therethrough. As in the case of the smaller openings 114, the diameter and quantity of the tubes 117 is dependent on the volume of water to be treated. In a water treating plant operating with a capacity of 10 liters per hour, it has been found that three tubes having an inside diameter of ¼ inch operated satisfactorily.

The four vertical walls, forming each section, do not follow a straight-up pattern but are indented to form small steps 118, a little wider than the thickness of the four vertical walls so that the baffles or inclined walls 111 may be placed over each other and inclined in opposite directions, with gaskets 90 positioned between sections. Placing of the baffles 111 in opposite directions serves to prolong the time that it will take the water to travel through the mixing chamber 60 from the top to the bottom, and at the same time, prolongs the time that it will take the ozone to travel through the mixing chamber 60 from the bottom to the top and also serves to give the water more time to be in contact with the ozone, thus facilitating the mixing of the ozone and water.

As hereinbefore mentioned, the uppermost and lowermost sections 60a and 60j, respectively, have slight modifications thereto. To the uppermost section 60a there has been added a small untreated water inlet in vertical wall 91. Firmly affixed in the opening is a fitting to which is attached the tube 48' to permit the untreated water to flow into the mixing chamber 60. To the lowermost section 60j, an ozone gas inlet 62 and a purified water outlet 63 are provided with suitable fittings. Inlet 62 has connected thereto the tube 37 through which ozone is introduced to the lowest section of the mixing chamber 60. To outlet 63 is connected tube 64 which is supported by bracket 120 and through which the purified or treated water is translated to the storage chamber 21.

The mixing chamber 60 not only serves to facilitate the mixing of the ozone with the water, but, due to its construction, provides a unit that can be easily dismantled and cleaned. It should be readily apparent that all that is necessary to dismantle the unit is to remove the fastening nuts securing the uppermost channel 96. Accordingly, when the water to be treated contains any precipitable matter that is precipitated during the treating process, the matter can be readily cleaned out from time to time.

Referring again to FIGURE 6, there is illustrated the flows of the water and ozone as they intermingle through the mixing chamber. The entire interior area of each section is occupied by water with the exception of the chamber 113 of each section and the area represented by circles 125 of varying diameter which represent ozone being bubbled through the water. Untreated water is introduced to the mixing chamber 60 and, after flowing through sections a–j enters sections 60h at the upper left side, passes through tubes 117 and then travels from left to right. It should be noted that the inclined surface of the baffle 111 helps to produce a turbulent flow in the water which aids to make the mixture of the water and ozone more homogenous, and at the same time increases the probability of contact between the water and the ozone. The turbulent movement of the water continues until it reaches tube 117i of the next lower baffle 111i where the same process is repeated. The process continues section by section, working through the whole set of baffles, until the lowermost baffle is reached. The water then passes through outlet 63 and tube 64 into the storage chamber 21 where it is readily accessible for use through valve 65.

While the water is passing downwardly through the various sections 60a to 60j, the ozone from the ozone generating unit 33 is introduced into section 60j of the mixing chamber 60 through inlet 62, tube 126 and diffuser 127. The diffuser 127 causes the ozone to bubble up through the water until it reaches the undersurface of the inclined wall or baffle 111j. The sloping surface causes the bubbles to flow across to the left side of section 60j until they reach the end of baffle 111j. At this point, the ozone enters the small chamber 113j, and from the chamber the ozone flows up and out through the small openings 114j and diffuses again in the water in the next adjacent upper section 60i.

The ozone, as it flows from one side to the next of each section passes along the undersurface of the inclined baffles and flows counter to the flow of water. It can be readily appreciated that there is produced a counter zigzag or tortuous flow between the water and ozone which serves to increase the time in which the ozone and water are in contact with each other and facilitates the mixing of the ozone with the water.

It should be noted that the chamber 113 of each section never fills up with water. The ozonated air in passing up through the several small openings 114 must break up the resistance produced by the water surface tension. That is, since plate 115 and the several openings 114 therein are covered with water, the ozone in passing through the openings 114 must push this water away and also overcome the water surface tension at the various openings 114. In pushing up the water, there is not required any energy to raise the water itself because the system is in equilibrium; however, there is energy required to overcome the inertia of the water and the water surface tension at the various openings 114. Consequently, a differential pressure exists to produce the required energy. This back pressure is obtained due to the height of the small air chamber 113. That is, the height of the small air chamber 113 is equivalent to the head necessary to produce a differential pressure sufficient to break up the water surface tension and to overcome the inertia of the water at the openings of plate 115.

The operation of the water treatment plant of the present invention may be described as follows. The unpurified water enters the head tank 20 through inlet 44 and is maintained at a desired level by float valve 43. From the head tank 20, the water passes to the mixing chamber 60 through tube 48, solenoid stop valve 50, tube 48' and water inlet 61 in the upper section 60a of the mixing chamber 60. Intake air is taken in at the compressor 22 and compressed. The resultant low pressure compressed air is passed through a tube 25 to the ozone generating unit 33. The air enters inlet 26 of the ozone generating unit 33 tangential to the outer conductor 73 of the dielectric tube 32. The air passes through the outer wire mesh conductor 73 and is spiralled upward while being subjected to an electrical discharge to produce ozone. The ozone is then passed through tube 37 to the inlet 62 in the lower section 60j of the mixing chamber 60 and through the diffuser 127. When the ozone is expelled from the diffuser 127, it begins to bubble. This bubbling moves upward and flows through the mixing chamber from bottom to top in a zigzag pattern. At the same time, the water that entered at the upper section of the mixing chamber 60 through inlet 61 flows downwardly in a zigzag pattern, but counter to that of the ozone, until the water reaches the outlet 63 from where it leaves the mixing chamber, completely purified, through tube 64 to the storage chamber 21.

Although a particular embodiment of the subject invention has been described, many modifications may be made, and it is intended by the appended claims to cover

What is claimed is:

1. A mixing chamber for treating a source of water with ozone comprising a plurality of vertically stacked sections, adjacent sections being separated by an inclined baffle plate, means connecting the uppermost section to the source of water to be treated, means connecting the lowermost section to a source of ozone for treating said water, outlet means in the lowermost section for discharging the treated water, each of said inclined baffle plates having means to control the flow of water and ozone therethrough, each of said baffle plates in adjacent sections being inclined in opposite directions for providing a tortuous path for the water to be treated and the ozone to increase the time of contact between the ozone and the water to be treated, said means to control the flow of untreated water and ozone including a substantially rectangular chamber at the upper end of the incline of each baffle plate, said chamber having a plurality of tubes extending therethrough for communication between adjacent sections, said tubes being arranged to pass water from an upper section to a lower section, said chamber being opened at its lower surface for communication with its corresponding lower section, and the upper surface of said chamber having a plurality of openings through which the ozone passes from a lower section to an upper section.

2. The mixing chamber as set forth in claim 1, wherein said plurality of tubes extending through said chamber comprises three tubes, each tube being approximately one-quarter inch in inside diameter and approximately one and one-half inches in length, and the upper surface of said chamber having twenty-seven openings of approximately one-sixteenth inch in diameter.

3. A mixing chamber for treating a source of water with ozone comprising a plurality of vertically stacked sections, each section comprising four vertically oriented side walls, a lower wall member and an upper wall member associated with said side walls, means connecting the uppermost section of said vertically stacked sections to the source of water to be treated, means connecting the lowermost section to a source of ozone for treating said water, outlet means in the lowermost section for discharging treated water, the lower wall member of the lowermost section being horizontally oriented and forming thereby the base of said mixing chamber, the upper wall member of the uppermost section being horizontally oriented and forming thereby a cover for said mixing chamber, adjacent sections being separated by an intermediate baffle plate forming the upper and lower wall members of adjacent sections, each intermediate baffle plate being inclined, each inclined baffle plate including means to control the flow of water and ozone therethrough, said intermediate baffle plates being arranged to provide a tortuous path for said water to be treated and ozone to increase the time of contact of the ozone and water, said means to control the flow of water and ozone including a substantially rectangular chamber at the upper end of the incline of each baffle plate, said chamber having a plurality of tubes extending therethrough for communication between adjacent sections, said tubes being arranged to pass water from an upper section to a lower section, said chamber being open at its lower surface for communication with its corresponding lower section, the upper surface of said chamber having a plurality of openings through which the ozone passes from a lower section to an upper section.

4. The mixing chamber as set forth in claim 3, wherein said plurality of tubes extending through said chamber comprises three tubes, each tube being approximately one and one-half inches in length, and the upper surface of said chamber having twenty-seven openings of approximately one-sixteenth inch in diameter.

References Cited

UNITED STATES PATENTS

| | | | |
|---|---|---|---|
| 545,392 | 8/1895 | Tracy | 261—114 |
| 755,705 | 3/1904 | Schanche | 261—114 |
| 1,047,534 | 12/1912 | Joseph | 210—192 X |
| 1,363,589 | 12/1920 | Hartman | 210—192 X |
| 1,366,494 | 1/1921 | Roberts | 261—114 X |
| 1,822,323 | 9/1931 | Stover et al. | 261—114 |
| 2,149,362 | 3/1939 | Riegler | 261—114 X |
| 2,582,826 | 1/1952 | Glitsch | 261—114 X |
| 2,591,343 | 4/1952 | Eld | 261—114 X |
| 3,083,148 | 3/1963 | Mojonnier | 261—123 X |

SAMIH N. ZAHARNA, *Primary Examiner.*

C. DITLOW, *Assistant Examiner.*